July 26, 1938.  H. C. KNERR  2,124,577
METHOD AND APPARATUS FOR TESTING METAL ARTICLES FOR DEFECTS
Filed Jan. 30, 1932  3 Sheets-Sheet 1
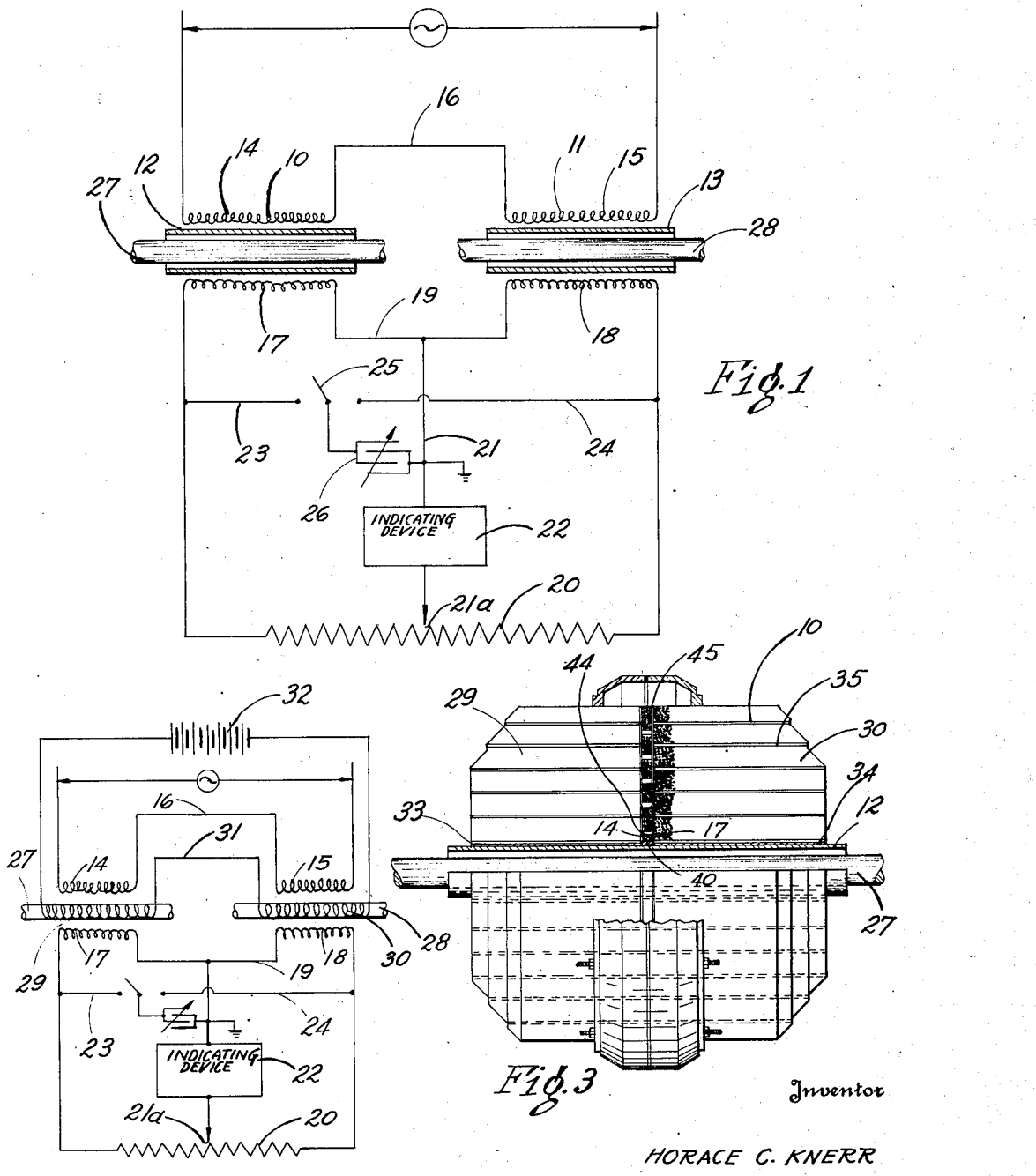
Inventor
HORACE C. KNERR
By Richey & Watts
Attorneys July 26, 1938.  H. C. KNERR  2,124,577
METHOD AND APPARATUS FOR TESTING METAL ARTICLES FOR DEFECTS
Filed Jan. 30, 1932  3 Sheets-Sheet 2

Inventor
HORACE C. KNERR
By Richey & Watts
Attorney

July 26, 1938.  H. C. KNERR  2,124,577
METHOD AND APPARATUS FOR TESTING METAL ARTICLES FOR DEFECTS
Filed Jan. 30, 1932  3 Sheets-Sheet 3
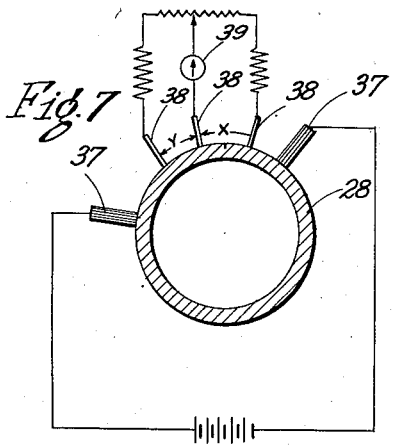
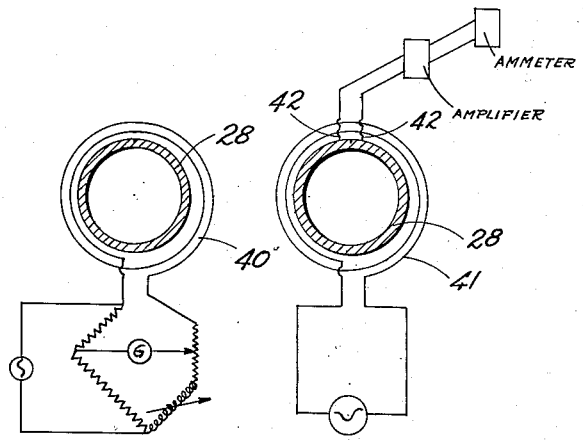
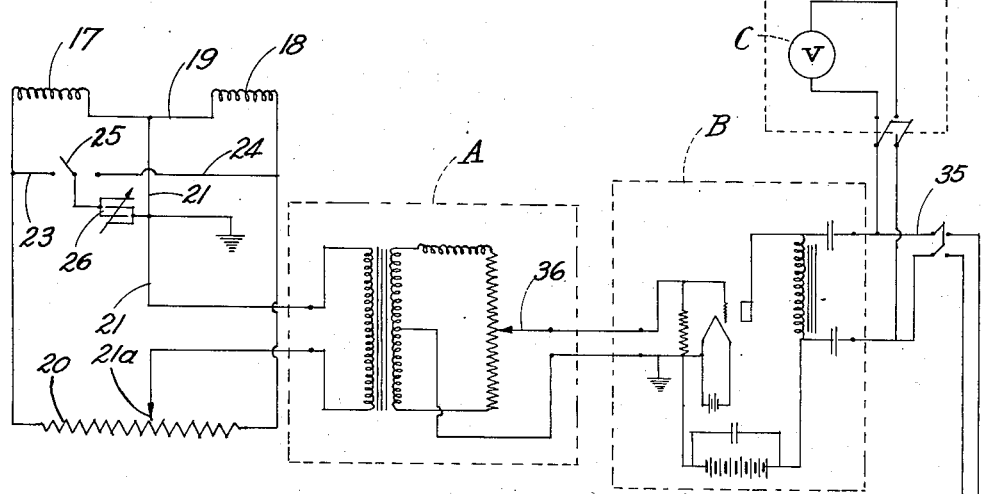
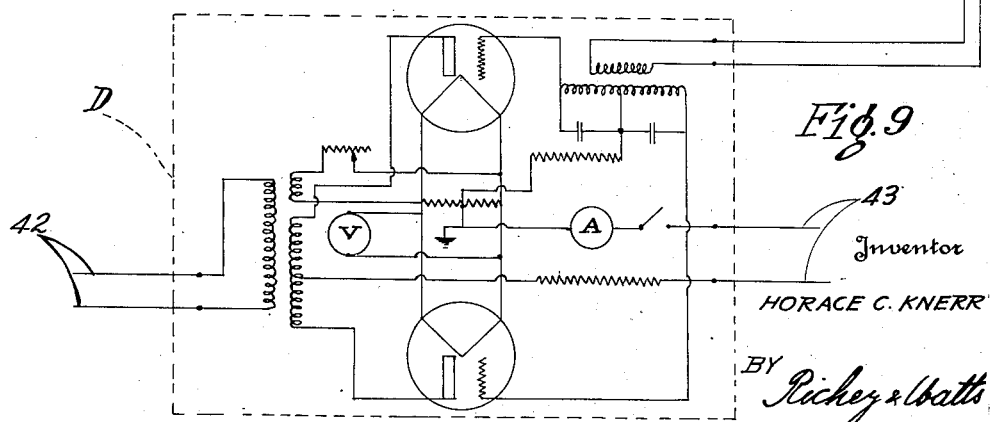
Inventor
HORACE C. KNERR
BY Richey & Watts
Attorneys Patented July 26, 1938

2,124,577

UNITED STATES PATENT OFFICE 2,124,577

METHOD AND APPARATUS FOR TESTING METAL ARTICLES FOR DEFECTS

Horace C. Knerr, Philadelphia, Pa., assignor to Steel & Tubes, Inc., Cleveland, Ohio, a corporation of Ohio Application January 30, 1932, Serial No. 589,887

9 Claims. (Cl. 175—183)

The present invention relates to a method of testing metal articles for defects and may be practiced on many different articles such as tubes, bars, rods, and structural shapes. The articles may be of long or short axial length but long articles should, preferably though not necessarily, be of substantially constant cross-section.

The invention also relates to new and improved apparatus for carrying out the method.

This invention is particularly suited to the detection of defects of appreciable axial length in metal articles. For example, it is sensitive to a defect of the order of about $\frac{1}{16}''$ or more in axial length but is comparatively insensitive to extremely short defects such as the discontinuity which would exist between two articles pressed end to end against each other. The method is particularly sensitive to defects in the portions of the article remote from the axis. For example, defects in a tube wall or defects in the outer parts of a rod are readily detectable by this method.

This method is capable of detecting, under the foregoing conditions, defects such as cracks, crevices, pits, inclusions of slag or other foreign material, imperfectly welded seams of tubes or variations in the wall thickness of tubes.

For many uses of tubing, rods, bars, and other articles comprehended herein, it is desirable that the presence of defects therein should be determined before much time and labor has been expended on such materials, while, for other uses, it is often vital that defects be detected before actual use is made of the materials. Often the defects are not visible or are detectable by the eye only with difficulty, and for many uses even concealed or apparently small defects may be very important. For example, great care must be exercised in selecting tubing for use in aircraft construction. A tube which has a longitudinal defect, however small, extending partially through its wall may fail in the locality of the defect when subjected to the repeated reversal of stresses such as may occur in airplane service.

Various methods of testing tubing, bars, rods, and the like, are now in common use but these methods do not entirely satisfy the demand for a method that will detect the small defects of the character above mentioned, particularly such longitudinally extending defects.

The present invention is based, fundamentally, on the fact that defects of the foregoing character in metal articles vary the reaction of the articles on current flowing therein. The present invention utilizes these reactions and their variations to locate the defects and does so independently of the magnetic character of the material of which the articles are composed. In a simple form, the process may be carried out by causing current to flow partially or entirely around in an article of the foregoing description and determining the reactions of the article on such current flow. The current may be supplied by a suitable source directly to the article, or it may be induced in the article by flow of current in a conductor extending around the article. The current, whether set up directly or by induction, may be designated as an "exciting" current. The current which sets up the "exciting" current may be termed "energizing" current and in certain instances may be direct current which is constant, interrupted or pulsating, while in other instances it may be alternating current.

The determination of the reactions of the article on the exciting current may involve a determination of; (a) the resistance of a part of or all the outer portion of the article to the flow of current therein, or (b) the impedance of a part or of all the outer portion of the article, or (c) the phase angle shift of the current flowing in a conductor around the article. The determination may be made on an article being tested by comparing the reactions and their variations on the current caused (a) by different parts of the article, or (b) by the article as compared with those a similar but satisfactory or standard article would have under the same conditions, or (c) by the article as compared with those of a similar but satisfactory or standard article. The presence of a defect in the portion of the article in which induced current is flowing circumferentially may have any one or more of several effects on the induced current. The defect may divert the current laterally in the surface portions of the article or may divert it deeper into the article. The defect may reduce the amount of current flow or shift its phase angle due to increased resistance. All these effects may collectively be called distortions and hence the terms such as distort, distorted or distortion as used herein are to be understood as referring to one or more of the foregoing actions or results. Magnetic methods of testing articles for defects have not met with universal success because the magnetic variations in the material, due to causes other than defects, tended to mask the magnetic variations caused by the defects, and themselves cause even greater variations than those caused by the defects. In the present invention the determinations are based fundamentally on resistance to a flow of current in the article and thus are not dependent on magnetic variations of the material. In testing magnetic materials by the present method where small defects are to be located the effects of magnetic variations of the material are preferably overcome by rendering the material substantially non-magnetic with respect to the energizing current, as by subjecting the material to a sufficiently high degree of magnetic saturation. This saturation may be accomplished by setting up a strong magnetic flux axially of the article, as by passing direct current in a coil around the article, or by bringing the article into the field of a suitable electromagnet.

Apparatus for practicing the method of this invention, in one of its simple forms, may comprise contactors for leading current to and from the article so that the current will flow partially or entirely around the article, and means, in the form of a Wheatstone bridge, for determining the reactions of the article on the current. In another form, the apparatus may comprise a coil around the article and constituting one arm of a Wheatstone bridge. Another form may comprise sets of primary and secondary coils, one set surrounding the article being tested and the other surrounding a similar standard article with means, such as a sensitive galvanometer, with or without amplifying devices connected with the secondary coils to compare the voltages or currents in these coils.

Another apparatus may include the sets of coils just mentioned with a Thyratron tube circuit (a Thyratron tube is an electric tube known by that name and now being made by the General Electric Company and possessing the property of extreme sensitivity to small phase shifts) connected with the secondary coils directly or through suitable amplifier and phase controls to compare voltages or current therein, and with or without means for saturating magnetic material as just described.

The present invention will be better understood by the following description of specific steps employed in carrying out the invention and by reference to certain forms of apparatus useable therewith and shown on the accompanying drawings.

Figure 1 is a wiring diagram showing the apparatus for testing non-magnetic materials in accordance with the principles of the present invention.

Figure 2 is a wiring diagram, similar to Figure 1, but showing apparatus for testing magnetic materials.

Figure 3 is a side view partly in section of a coil unit.

Figures 4, 4A, 5, 6:
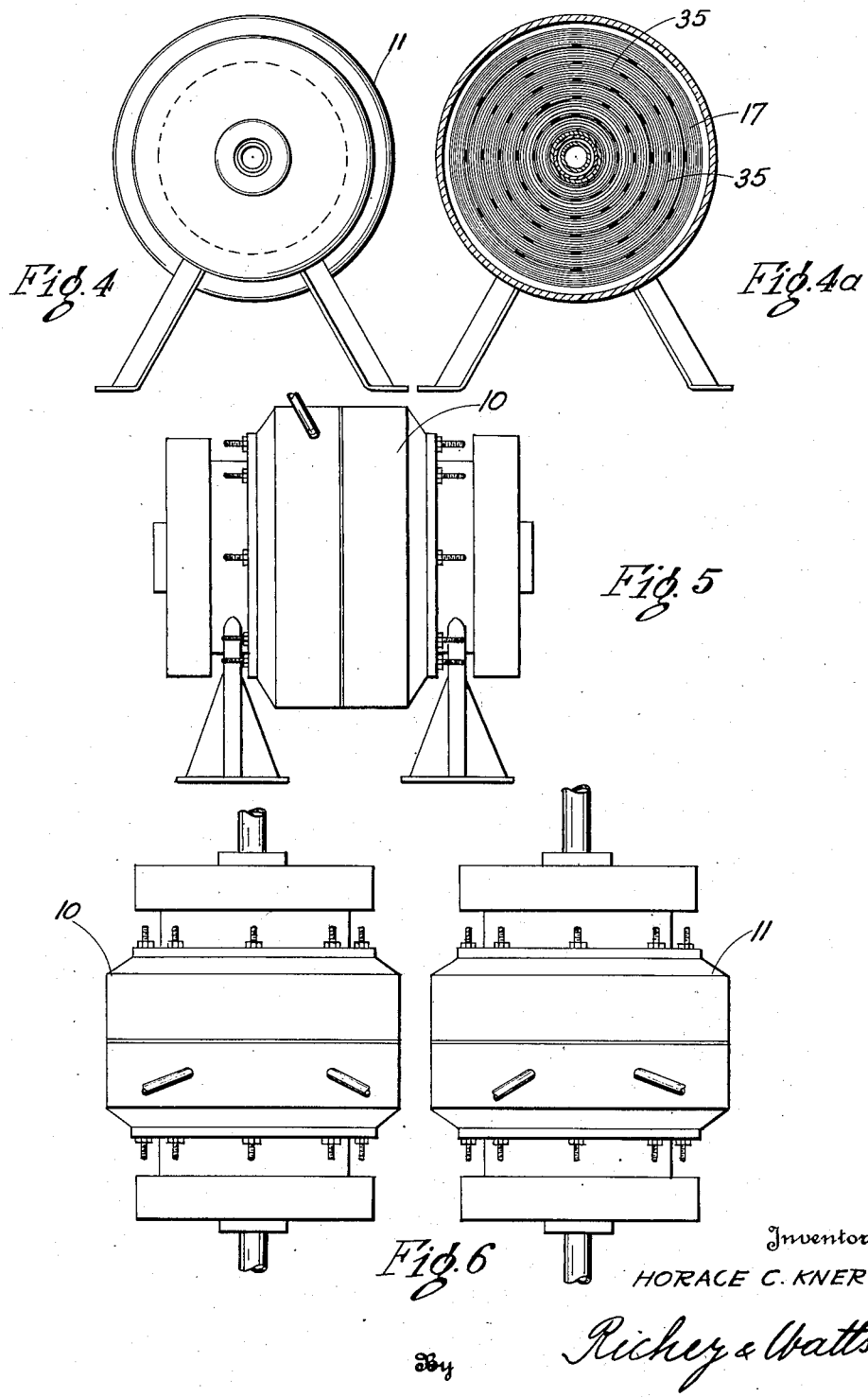

Figures 4 and 4ª are end elevation and cross-sectional views of the coil unit of Figure 3.

Figure 5 is a side elevation of a coil unit.

Figure 6 is a top plan view of apparatus for practicing the invention.

Figure 7 is a wiring diagram of apparatus in which the energizing current passes through the article itself and in which a Wheatstone bridge is used.

Figure 8 is a diagram similar to Figure 7 but showing a primary coil for the energizing current.

Figure 9 is a wiring diagram showing the circuit of two Thyratron tubes with the apparatus of Figure 1 or 2.

Figure 10 is a wiring diagram of another modified form of apparatus.

In all of the above described views, like characters of reference are employed to designate like parts throughout.

In Figure 1 is shown, diagrammatically, apparatus embodying the present invention and devised for use in testing metal tubing of non-magnetic material. Two test devices, designated as entireties by characters 10 and 11, consist, respectively, of assembly tubes 12 and 13, preferably composed of non-conducting material on which are wound, respectively, primary coils 14 and 15 connected in series as at 16 and also connected to a suitable source of alternating energizing current (not shown). Secondary coils 17 and 18, respectively, are also mounted on tubes 12 and 13 and joined together in series as at 19 and are also connected together through resistance 20. A conductor 21 extends to and makes sliding contact with this resistance 20 for adjustment purposes. Included in series in the conductor 21 is an indicating device 22 consisting of an amplifier and a voltmeter. (Not shown). Leads 23 and 24 from coils 17 and 18, respectively, may be connected through double throw switch 25 and variable condenser 26. Tubes 12 and 13 are of suitable diameter so that a standard tube 27 and a test tube 28, respectively, may be concentrically mounted therein and/or moved axially therethrough.

In Figure 2 is shown, diagrammatically, the apparatus of Figure 1 adapted for use in testing tubing composed of magnetic material. In addition to the apparatus of Figure 1, Figure 2 contains direct current coils 29 and 30 around tubes 27 and 28, respectively, joined together as at 31 and to a suitable source of direct current, such as a battery 32. If a generator is employed instead of a storage battery 32, care should be taken that any alternating current components in the direct current coils shall be substantially offset by the alternating current in the primary coils 14 and 15 so as to exert no detectable effect on the induced current in the secondary coils 17 and 18. This may be done by suitably arranging the connections of the coils.

Figure 9 shows in detail, diagrammatically, apparatus which may be employed at the station marked "22" on Figure 1 or 2. As shown in Figure 9, this complete unit consists of devices A, B, C, and D; device A being shown as a variable phase control apparatus; device B comprising a vacuum tube amplifier; device C being a voltmeter; and device D being a Thyratron tube apparatus.

When apparatus as shown by Figure 9 is employed with the apparatus of Figure 1 or 2 and when the current flowing in coils 17 and 18 is to be balanced preliminary to test, the device D is disconnected as by opening the thyratron grid switch 35, then the primary coils 14 and 15 are energized with the tubes 27 and 28 in place as shown in Figure 1 and the current flowing in coils 17 and 18 is balanced. This balancing is accomplished by throwing switch 25 alternately into contact with leads 23 and 24 and shifting contact 21ª along 20 and varying the setting of condenser 26. In some instances it may be necessary to shift contact 21ª and then partially balance the currents in the two circuits 17 and 18 by adjustment of condenser 26, then again shift contact 21ª and repeat the adjustment of the condenser, until finally the currents flowing in these two coils are in substantial balance. Then the coils are unbalanced to a pre-determined amount as by shifting the sliding contact 21ª on resistance 20. Then the grid switch 35 is thrown to connect the device D with the other devices of Figure 9. Then the sliding contact 36 in the variable phase control device A is adjusted until the Thyratron device D, will pass little or no current when the smallest defect to be located is present in the portion of article under test, but will pass full current when a smaller defect or no defect is present. Then the tube 28 under test is passed axially through device 11 and the locations of defects in the tube are found by observing what portions of the tube are within the primary coil 15 of device 11 when little or no current flows through the Thyratron tubes. This operation is preferred because it not only indicates the presence of defects but also gives an indication as to whether or not the Thyratron tube device is functioning properly. For example, if the Thyratron tube should fail to function in detecting defects, this failure would at once result in cessation of flow of current through the tube device. Accordingly, this operation is preferred. However, if desired, the tube device may be arranged to pass full current when defects to be detected are present and little or no current when the tube is free from defects above the minimum size to be detected.

The tube device may be adjusted so as to distinguish defects of different magnitudes above the minimum size to be detected. Normally the plate and grid voltages are about 180° apart and no variation in magnitude of defects is indicated but if the grid voltage is advanced slightly, for example 10°, the variation in magnitude of different defects are indicated.

The Thyratron tubes are energized by current in leads 42 from a suitable source, which is alternating current of the same frequency as that of the primary coils.

Figure 9 shows apparatus of a preferred form but part only of such apparatus may be used with good results. For example, the variable phase control, device A of Figure 9 and the Thyratron tube apparatus, device D, may be omitted, the amplifier device B, being connected directly in the line 21 with the voltmeter, device C, following it as shown in Figure 9. When such modified apparatus is employed the balancing of the currents flowing in coils 17 and 18 is carried out substantially as set forth in the preceding paragraph except that since devices A and D have been omitted, all the adjustments are made by shifting contact 21ª and the setting of condenser 26. To secure such sensitivity to flows, the current should then be unbalanced by a predetermined amount by adjusting condenser 26 instead of moving contact 21ª or when Thyratron is used. The presence of defects are noted by observing the action of the voltmeter as the tube under test is passed through the primary coil 15 of device 11.

With the apparatus of Figure 1 set up and connected as shown for testing, for example, steel tubing, of up to about 14 U. S. S. gauge thickness and up to about one inch in outside diameter, an alternating current of about 500 cycles has been found to be satisfactory for energizing the coils 14 and 15.

The operation of the apparatus of Figure 2 is substantially the same as that just described for Figure 1 with the addition, however, that direct current is flowing in the coils 29 and 30 before the balancing of coils 17 and 18 begins, and magnetically saturates the tube so that the magnetic material of the tube will become substantially non-magnetic with respect to the current in the coils 14, 15, 17 and 18. Direct current of about 40,000 ampere turns is sufficient to saturate magnetically the part of a fourteen gauge one inch steel tube in unit 10 or 11.

The output from the amplifier device B may be used to operate a relay (not shown) which would control apparatus for marking the tube to indicate the location of a defect. The output from leads 43 from the Thyratron tube device D may be utilized to actuate a similar relay or even to actuate defect-indicating apparatus.

In Figure 7 is shown a simple form of the apparatus referred to hereinabove. A section of tube 28 is supplied with energizing current through suitable contacts 37. Between these contacts and disposed circumferentially of the tube in the location to be tested for defects are three contacts 38, leads from which are connected together as shown, a galvanometer 39 being mounted in the lead from the center contact. The energizing current is supplied to the tube through contacts 37 and the part of such current which flows circumferentially in the tube between the contacts 38 is exciting current. The resistances in the circuit including contacts 38 are so adjusted that when no defects are present in "X" or "Y" no current will flow through the galvanometer. When a defect is present in "X" current will flow through and actuate the galvanometer, thus locating the defect.

In Figure 8 another simple form of apparatus is shown. It comprises a coil for energizing current wound around a tube 28 to be tested. The coil 40 comprises one branch of a bridge circuit. The bridge circuit is so adjusted that when the part of tube 28 in coil 40 is free from defects no current flows through the galvanometer G with or without an amplifier (not shown). As the tube is moved through coil 40, any defect will vary the resistance to the flow of exciting current in the tube with a resultant reaction on the energizing current which will in turn destroy the balance of the bridge circuit and consequently cause a deflection of galvanometer G. By means of this apparatus, a standard tube, that is, one satisfactorily free from defects, may be used to adjust the bridge circuit, and then a similar tube to be tested can be substituted for the standard tube. Moreover, by this apparatus the adjustment of the bridge circuit may be made with a part of a tube, satisfactorily free from defects, in the coil 40. Then the remainder of the tube may be tested with such part thereof as a basis. Furthermore, the bridge circuit can be set on the basis of a predetermined standard and then the tubes tested thereagainst.

In Figure 10, a coil 41 extends around tube 28 and is energized by a suitable source of alternating current. Contacts 42 extend from closely spaced points on the tube to an amplifier and an ammeter. When no flaw is present in the tube between contacts 42 there will be no potential difference between these contacts. A defect between these contacts will cause a potential difference which will be detected by the ammeter. The method and apparatus of Figure 10 are of advantage in certain uses because an article may be tested to its very end and because difficulties due to certain variables encountered in other apparatus illustrated herein are avoided. Such variables include variation in wall thickness, heat treatment or mechanical or chemical conditions of the tube and changes in frequency of the energizing current. This method and apparatus is of advantage where the circumferential location of possible defects is known, as in the weld of a tube or pipe, or where only a part of the circumferential dimension of the article is to be examined for defects.

In Figures 3 to 6, inclusive, are shown the test units previously referred to as entireties by characters 10 and 11. In Figure 6 these units are shown side by side in the position they may occupy in a commercial testing apparatus embodying the present invention. Since these test devices are alike in substantially all respects, only one will be described in detail.

Referring particularly to Figures 3 and 4 the device 10 consists of an assembly tube 12, in which a tube 27 may be disposed concentrically and if desired, passed axially therethrough. On tube 12 are mounted two similar tubes 33 and 34 and upon each of these latter tubes, direct current coils 29 and 30, respectively, are wound, spacers 35 extending parallel to the axis of the coils at circumferentially spaced points to provide passages between the turns for cooling fluid, such as oil, to flow under pressure for the purpose of maintaining the coils at a constant uniform temperature.

Between the coils 29 and 30 a flat or pancake winding is disposed. This unit consists of a short non-conducting tube 40 resting on assembly tube 12 and having wound directly thereon the secondary coil 17. This coil may, for example, consist of 300 turns of No. 40 enameled cotton covered wire. The primary coil 14 consisting, for example, of 100 turns of No. 22 enameled cotton covered wire, is wound about the secondary coil 17 and is surrounded by a non-conducting, for example, phenol condensation product tube 44 around which is wound sufficient turns of direct current coils 29 and 30 to make the total diameter of the pancake coil substantially the same as that of the coils 29 and 30. Spacers similar to 35 are provided in these direct current windings of the pancake coil for passage of cooling fluid therethrough and in addition, radial strips 45 along the sides of the pancake coil provide passages for fluid between this coil and the direct current coils 29 and 30.

The primary, secondary and direct current coils just described are enclosed in a case and cooling liquid, preferably oil, is pumped into the case under pressure so that it will flow through all of the passages in the coils and keep the entire device at a constant uniform temperature.

Subject matter disclosed herein but not claimed is claimed in the co-pending application of Horace C. Knerr and Cecil Farrow, Serial No. 589,888, filed January 30, 1932, now United States Patent No. 2,065,379, issued December 22, 1936, or in an application in the names of Knerr and Sharpless, Serial No. 627,798, filed August 6, 1932.

Having thus described my invention so that those skilled in the art may be able to practice the same, what I desire to secure by Letters Patent is defined in what is claimed.

What is claimed is—

1. The method of locating defects in a metallic non-magnetic article, comprising subjecting the article to a substantially constant alternating exciting field and thereby inducing in the article circulating currents which create a counter-magnetic field externally of the article, flow of said circulating currents and said counter-magnetic field being substantially uniform in regions free from defects and being distorted by a defect in a region exposed to said exciting field, and electrically detecting the occurrence of such distortion of said counter-magnetic field caused by a defect.

2. The method of locating defects in a metallic non-magnetic article, comprising progressively moving the article relative to a substantially constant high-frequency alternating exciting field to induce in the article circulating currents which flow in a direction transverse to the prevailing direction of defects and which create a counter-magnetic field externally of the article, flow of said circulating currents and said counter-magnetic field being substantially uniform in regions free from defects and being distorted by a defect as it moves through said exciting field, and electrically detecting such distortion of said counter-magnetic field caused by a defect.

3. The method of locating defects in a metallic non-magnetic article, comprising subjecting the article to a substantially constant alternating exciting field and thereby inducing in the article circulating currents which create a counter-magnetic field externally of the article, flow of said circulating currents and said counter-magnetic field being substantially uniform in regions free from defects and being distorted by a defect in a region exposed to said exciting field, and by electrical induction from said counter-magnetic field detecting the occurrence of such distortion of said counter-magnetic field caused by a defect.

4. In apparatus for locating defects in a metallic non-magnetic article, comprising an induction coil arranged for passage through its field of the article to be tested and adapted to be connected to a source of substantially constant high-frequency alternating current, and defect-detecting electrical means disposed for actuation by the distorted portion of the counter-magnetic field set up externally of the article by the circulating currents induced in the article by said induction coil, said distortion being caused by a defect as it moves through the field of said induction coil.

5. The method of locating defects in a non-magnetic metallic article comprising moving the article progressively relative to a substantially constant high frequency alternating exciting field and thereby inducing in the article circulating currents which create a counter-magnetic field external to the article, said flow of said circulating currents and said counter-magnetic field being substantially uniform in regions free from defects and being distorted by a defect as it moves in the said field, and by electrical induction from said counter-magnetic field detecting the occurrence of such distortion of said counter-magnetic field caused by a defect.

6. The method of locating defects in a metallic non-magnetic article comprising progressively moving the article relative to a substantially constant high frequency alternating exciting field to induce in the article circulating currents flowing in a direction transverse to the prevailing direction of defects and which create a counter-magnetic field external to the article, said flow of said circulating currents and said counter-magnetic field being substantially uniform in regions free from defects and being distorted by a defect as it moves in said exciting field, and detecting defects in the article by electrical induction from said counter-magnetic field and measuring variations in the resultant E. M. F. due to distortion of said counter-magnetic field caused by the defects.

7. An apparatus according to claim 4 for testing tubing, said exciting and detecting coils being arranged concentric to the tube.

8. Apparatus for electrically testing electrically conductive articles for defects which includes a coil having an axial opening and a fixed axis and being adapted to carry alternating current, said coil being so mounted that relative axial movement may take place between said coil and an electrically conductive article which is long axially as compared with the axial length of said coil and is disposed in inductive relation thereto, the alternating current flowing in said coil serving to induce a flow of current circumferentially in the portion of the article within said coil, a detector circuit adapted to carry current induced by the current flowing in said coil, said circuit having a part operatively associated with the exterior surface of the article and located in fixed position relative to the coil, and electrical means operatively associated with the detector circuit for indicating variations in current flowing in said circuit and thereby locating the presence and position of defects.

9. The method of testing electrically conductive articles for defects which includes the steps of creating an alternating magnetic field thereby inducing a flow of current circumferentially in an axially short portion of an elongated electrically conductive article, moving the article and field axially relative to each other, bringing into fixed operative relation to the exterior of the article electrical means to detect variations in the flow of induced current in the article caused by defects in the article, and determining the presence and position of defects in the article by indicating variations in current flow detected by said electrical means.

HORACE C. KNERR.